United States Patent
Saxena et al.

(10) Patent No.: US 10,459,454 B2
(45) Date of Patent: Oct. 29, 2019

(54) PLATOON CONTROL

(71) Applicant: NXP B.V.

(72) Inventors: Apoorva Saxena, Eindhoven (NL); Hong Li, Veldhoven (NL); Dip Goswami, Eindhoven (NL)

(73) Assignee: NXP B.V., Eindhoven (NL)

( * ) Notice: Subject to any disclaimer, the term of this patent is extended or adjusted under 35 U.S.C. 154(b) by 126 days.

(21) Appl. No.: 15/694,639

(22) Filed: Sep. 1, 2017

(65) Prior Publication Data

US 2018/0120861 A1    May 3, 2018

(30) Foreign Application Priority Data

Oct. 31, 2016  (EP) .................................... 16196605

(51) Int. Cl.
  *G05D 1/02*  (2006.01)
  *G05D 1/00*  (2006.01)
  *G08G 1/00*  (2006.01)

(52) U.S. Cl.
  CPC ......... *G05D 1/0291* (2013.01); *G05D 1/0088* (2013.01); *G05D 1/0295* (2013.01); *G08G 1/22* (2013.01)

(58) Field of Classification Search
  CPC .. G05D 1/0295; G05D 1/0088; G05D 1/0291; G08G 1/22
  See application file for complete search history.

(56) References Cited

U.S. PATENT DOCUMENTS

| | | | |
|---|---|---|---|
| 6,397,149 B1 | 5/2002 | Hashimoto | |
| 6,765,495 B1 | 7/2004 | Dunning et al. | |
| 8,160,765 B2 | 4/2012 | Morselli et al. | |
| 8,352,111 B2* | 1/2013 | Mudalige | G08G 1/22 340/435 |
| 9,037,389 B2* | 5/2015 | You | G08G 1/22 701/117 |
| 9,396,661 B2* | 7/2016 | Okamoto | G08G 1/22 |
| 9,940,840 B1* | 4/2018 | Schubert | G08G 1/22 |
| 10,068,485 B2* | 9/2018 | Dudar | G05D 1/0293 |

(Continued)

FOREIGN PATENT DOCUMENTS

DE    100 22 357 A1    1/2001
WO    2016/134770 A1   9/2016

OTHER PUBLICATIONS

Vahidi et al., "Research advances in intelligent collision avoidance and adaptive cruise control", IEEE Transactions on Intelligent Transportation Systems, vol. 4, No. 3, pp. 143-153 (Sep. 2003).

(Continued)

*Primary Examiner* — Rachid Bendidi
(74) *Attorney, Agent, or Firm* — Rajeev Madnawat

(57) ABSTRACT

A method and apparatus are provided for controlling a vehicle travelling in a platoon. A first set of information is received at a first vehicle in a platoon, the first set of information relating to at least one other vehicle in the platoon. One of a plurality of control algorithms is selected in dependence on the first set of information, wherein each of the plurality of control algorithms correspond to a respective platoon communication topology. The first vehicle is controlled in response to the first set of information and the selected one of the control algorithms.

15 Claims, 4 Drawing Sheets

(56) References Cited

U.S. PATENT DOCUMENTS

| | | | | |
|---|---|---|---|---|
| 2007/0299947 | A1* | 12/2007 | El-Damhougy | H04W 76/028 709/223 |
| 2009/0079839 | A1* | 3/2009 | Fischer | G01S 7/003 348/218.1 |
| 2014/0316865 | A1 | 10/2014 | Okamoto | |
| 2015/0154871 | A1* | 6/2015 | Rothoff | G08G 1/22 701/2 |

OTHER PUBLICATIONS

European Telecommunication Standard Institute "Technical Report ETSI TR 102 861 V1.1.1, I, Intelligent Transport Systems (ITS); STDMA recommended parameters and settings for cooperative ITS; Access Layer Part", 48 pgs. (Jan. 2012).

Naus et al. "String-stable CACC design and experimental validation: A frequency-domain approach", IEEE Transactions on Vehicular Technology, vol. 59, No. 9, pp. 4268-4279 (Nov. 2010).

Oncu et al. "Cooperative adaptive cruise control: Tradeoffs between control and network specifications", IEEE Intelligent Transportation Systems Conference (ITSC), pp. 2052-2056 (2011).

Alexander et al. "Cooperative Intelligent Transport Systems: 5.9-GHz Field Trials", Proceeding in IEEE, vol. 99, No. 7, pp. 1213-1235 (Jul. 2011).

European Telecommunication Standard Institute "Technical Report ETSI TS 102 687 V1.1.1, Intelligent Transport Systems (ITS);Decentralized Congestion Control Mechanisms for Intelligent Transport Systems operating in the 5 GHz range; Access layer part", 45 pgs. (Jul. 2011).

Sun et al. "Existence of a common quadratic Lyapunov function for discrete switched linear systems with m stable subsystems", IET control theory and applications, vol. 5, No. 3, pp. 535-537 (Feb. 17, 2011).

Saxena et al. "Design and Analysis of Control Strategies for Vehicle Platooning", International Conference on Intelligent Transportation Systems (ITSC), pp. 1805-1812 (2016).

* cited by examiner

PLATOON CONTROL

CROSS-REFERENCE TO RELATED APPLICATIONS

This application claims the priority under 35 U.S.C. § 119 of European Patent application no. 16196605.6, filed on Oct. 31, 2016, the contents of which are incorporated by reference herein.

FIELD

This application relates to the automated control of vehicles in a platoon formation and in particular but not exclusively to the use of vehicle to vehicle communication in automated platooning.

BACKGROUND

Intelligent Transportation Systems (ITS) are systems which aim to improve road safety by broadcasting real-time information pertaining to the road conditions. For example in such systems, cars or similar vehicles may broadcast information such as position, speed, road conditions, events and/or accidents. This information may be shared between vehicles using so-called Vehicle to Vehicle (V2V) communication and vehicles and other units such as road side entities or traffic control units using Vehicle to Infrastructure (V2I) communication. These communication systems may use IEEE 802.11p dedicated short range communication (DSRC) technology.

One application of ITS may provide vehicle platooning. Such vehicle platooning may automatically group a number of vehicles to travel together in an actively coordinated way, for example forming a train of vehicles. Vehicle platooning may be desired in order to improve road usage capacity and mitigate traffic, improve fuel efficiency, safety and driver comfort.

In order to co-ordinate such platooning, platooning control algorithms may be provided in each vehicle in the platoon to control that vehicle to hold itself in the platoon. These control algorithms may control vehicle parameters such as speed and acceleration. Such control algorithms may control the vehicle in response to receiving information about the platoon behavior from sensors on the vehicle or from other members of the platoon and/or other entities. For example, the algorithm may operate based on information received from radar sensors of the vehicle and/or V2V communication.

An aim of such a control algorithm may be to hold the vehicle in the platoon such that there is a relatively small distance between the member vehicles of the platoon. A smaller vehicle to vehicle distance or gap may result in less airflow resistance and thus less fuel consumption.

The Adaptive Cruise Control (ACC) system in a vehicle may use radar and/or laser sensors to follow a vehicle directly preceding it. An ACC may not see any of the vehicles preceding its direct predecessor in the platoon and this may lead to a one-by-one propagation of any actions of a vehicle leading the platoon. Such one-by-one propagation may be adjusted for by providing a larger gap or travelling distance between platoon members.

In ITS, Common Awareness Messages (CAMs) may be broadcast at a 10 Hz rate by which each vehicle may broadcast information about itself using a control channel. Such information may comprise position, speed, acceleration and actions of the vehicle. Using CAM, a vehicle may use one message to broadcast such information to multiple vehicles simultaneously.

In cooperative adaptive cruise control (CACC), a vehicle may use information not only from its predecessor but also from other members of the platoon. While in some cases, a CACC system may limit propagation of disturbances throughout the vehicle chain in comparison to ACC due to the additional information, the increase in messages used to convey such information may be subject to network delay or problems associated with imperfect messaging mediums.

Embodiments of the present application aim to provide a method of vehicle platooning control while taking in account these real-world constraints.

SUMMARY

According to a first aspect of the present application, there is provided a method for controlling a vehicle travelling in a platoon comprising: receiving a first set of information at a first vehicle in a platoon, the first set of information relating to at least one other vehicle in the platoon; selecting one of a plurality of control algorithms in dependence on the first set of information, wherein each of the plurality of control algorithms correspond to a respective platoon communication topology; and controlling the first vehicle in response to the first set of information and the selected one of the control algorithms.

The first set of information may comprise at least one of radar information and one or more vehicle to vehicle messages. The radar information may for example be provided from a radar unit of the first vehicle. The vehicle to vehicle messages may be received over a communication channel from one or more other vehicles in the platoon. The method may comprise storing the first set of information in a memory.

The method may further comprise: receiving a second set of information at the first vehicle; selecting a further one of the plurality of control algorithms in dependence on the second set of information; and controlling the first vehicle in response to the second set of information and the selected further one of the control algorithms. In some examples sets of information may be received at the first vehicle periodically and/or cyclically. A selection of a control algorithm may be carried in response to a set of information being received in some embodiments. In other embodiments a selection of a control algorithm may be carried out whenever the type and/or number of messages in the set of information changes.

The method may further comprise: determining that no vehicle to vehicle messages are received as part of the second set of information; and selecting a prediction control algorithm from the plurality of control algorithms, the prediction control algorithm configured to predict further information for the second set of information based on the stored first set of information. In some examples, vehicle to vehicle messages may have been dropped in transit over a communication channel and may not arrive at the receiver. In some cases radar information from a radar sensor may be available. The controller may select a prediction control algorithm in response to no vehicle to vehicle messages being received. The vehicle to vehicle messages may comprise information about the driving state of the vehicle sending the message. If no vehicle to vehicle messages are received a prediction algorithm may predict a driving state of one or more vehicles in the platoon in dependence on one or more previously stored sets of information. The predicted further information may correspond to information carried in vehicle to vehicle messages.

The memory may be further configured to store control boundary information. The step of controlling the first vehicle further may comprise controlling the first vehicle further in response to the control boundary information. At least some of the control boundary information may be received from at least one other vehicle in the platoon. For example, each vehicle in the platoon may be configured to send their boundary conditions to each other vehicle. In other examples, the boundary information may be sent from a central entity.

The method may further comprise: determining that no vehicle to vehicle messages are received as part of the second set of information; and requesting information from at least one other vehicle in the platoon. In some cases, when it is determined that no vehicle to vehicle messages or information relating to the driving state of other vehicles is available, the platoon control system may request this driving state from one or more surrounding vehicles.

The method may further comprise: transmitting information associated with the first vehicle to at least one other vehicle in the platoon. The first vehicle may transmit for example vehicle to vehicle messages comprising the driving state and/or boundary information of the first vehicle. The information associated with the first vehicle may comprise at least one of a vehicle to vehicle message and control boundary information. The vehicle to vehicle message comprises information relating to the driving state of the first vehicle. In some examples the vehicle to vehicle messages may be common awareness messages (CAM).

According to a second aspect, there is provided an apparatus for controlling the behaviour of a first vehicle in a platoon, the apparatus comprising: at least one receiver configured to receive a first set of information relating to at least one other vehicle in the platoon; and a controller configured to: select one of a plurality of control algorithms in dependence on the first set of information, wherein each of the plurality of control algorithms correspond to a respective platoon communication topology; and provide control signals configured to control the first vehicle in response to the first set of information and selected control algorithm.

The first set of information may comprise at least one of radar information and one or more vehicle to vehicle messages. The apparatus may further comprise: a memory configured to store the first set of information. When the receiver receives a second set of information, the controller may be further configured to: select a further one of the plurality of control algorithms in dependence on the second set of information; and provide control signals configured to control the first vehicle in response to the second set of information and the selected further one of the control algorithms.

The controller may be further configured to determine that no vehicle to vehicle messages are received as part of the second set of information and select a prediction control algorithm from the plurality of control algorithms, the prediction control algorithm configured to predict further information for the second set of information based on the stored first set of information. The predicted further information may correspond to information carried in vehicle to vehicle messages.

The memory may be further configured to store control boundary information. The controller may be further configured to control the first vehicle further in response to the control boundary information. The receiver may be further configured to receive at least some of the control boundary information from at least one other vehicle in the platoon. The controller may be further configured to determine that no vehicle to vehicle messages are received as part of the second set of information, and request information from at least one other vehicle in the platoon.

The apparatus may further comprise: a transmitter configured to transmit information associated with the first vehicle to at least on other vehicle in the platoon. The information associated with the first vehicle may comprise at least one of a vehicle to vehicle message and control boundary information. The vehicle to vehicle message may comprise information relating to the driving state of the first vehicle. The apparatus may further comprise: a vehicle controller configured to receive the control signals and control the behaviour of the first vehicle in response thereto.

FIGURES

Embodiments will be described, by way of example only, with reference to the drawings, in which.

It will be appreciated that for features that span more than one drawing like reference numerals indicate the like feature.

DETAILED DESCRIPTION

Figure 1:
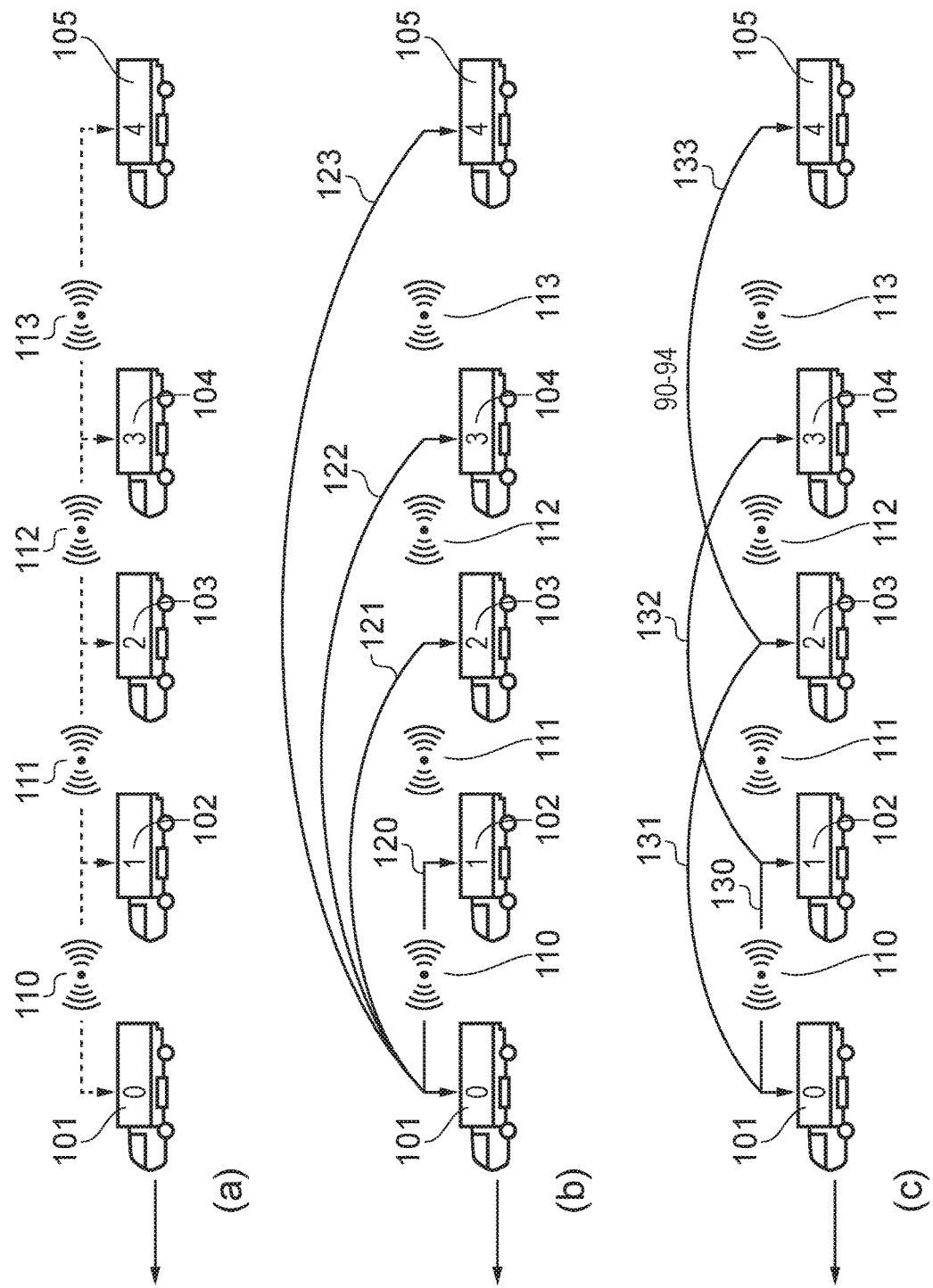
FIG. 1 is an example of a communication topologies that may be implemented in a vehicle platoon.

Various communication network topologies may be implemented in vehicle platooning.

FIGS. 1a, b and c show first 101, second 102, third 103, fourth 104 and fifth 105 vehicles travelling in numerical order. The first vehicle 101 is considered to be the platoon leader.

FIG. 1a shows an example of a predecessor-follower vehicle platooning communication topology. In this topology communication 110 occurs between the first 101 and second 102 vehicle, communication 111 occurs between the second 102 and third vehicle 103, communication 112 occurs between the third 103 and fourth 104 vehicle and communication 113 occurs between the fourth 104 and fifth 105 vehicle.

In this example, the communication takes the form of radar detection by a succeeding vehicle indicating that the vehicles radar has detected a preceding vehicle. It will however be appreciated that this is by way of example only, and the communication may take any form, for example may be V2V messages or other forms of obstruction detection. In this example, each vehicle of the platoon, except the platoon leader, receives information about the vehicle immediately preceding it. An example of this topology may be used in adaptive cruise control (ACC).

FIG. 1b shows an example of a leader follower vehicle platooning communication topology. In this topology each of the platoon vehicles 102, 103, 104 and 105 except the leader 101 receive a respective message 120, 121, 122 and 123 from the platoon leader 101. In addition, each of the vehicles 101 to 105 may carry out radar detection on the preceding vehicle.

FIG. 1c shows an example of a pre-predecessor follower platoon vehicle communication topology. In the topology of FIG. 1c, the platoon leader 101 provides a message 130 to the vehicle 102 immediately succeeding it and a message 131 to the vehicle 103 succeeding it but one. The second vehicle 102 in the platoon provides a message 132 to the fourth vehicle 104 which is the vehicle succeeding the second vehicle 102 but one. The third vehicle 103 in the platoon provides a message 133 to the fifth vehicle 105 which is the vehicle succeeding the third vehicle 103 but one. In addition, each of the vehicles 101 to 105 may carry out radar detection on the preceding vehicle.

In any of the communication topologies each message may comprise information relating to the sending vehicle such as a position and/or speed of the vehicle and/or an action of the vehicle or other information pertaining to the platoon. While FIGS. 1a, b and c shows three examples of such communication network topology, it will be appreciated that other network topologies may exist and may be compatible with embodiments of the present application.

The behaviour of a platoon may be dependent on the platooning communication topology implemented. For example, in platooning communication topologies where more information is available, the platoon may be controlled more accurately. However, in some systems, the platoon behaviour may be dependent on accurate communication and the assumption that messages between the vehicles of the platoon will be received in an accurate and timely manner. This may not always be the case.

Wireless communication imperfection may affect the implementation of a platoon and the platoon control may become sensitive to network imperfection such as congestion. A V2V message delivery rate may vary over the distance between a sender and a receiver. In some examples, the sequence in which the messages are broadcast may be changed due to MAC layer back-offs in a busy channel.

Furthermore, as ITS is adopted, the ITS network may start to suffer from network congestion. For example in a scenario comprising a 1 km highway with 2×3 lanes and an average car distance of 25 meters, approximately 240 cars may be in each other's access range and may send CAM messages with a packet rate of 10 Hz. A default modulation rate for communication on the control channel may be 6 Mbps. Simulation results may show that in such a congested situation 50% of the messages may be lost (due to message collisions in the air). This may be due to channel capacity limitation and CSMA-CA multiple access protocol overhead.

De-centralized Congestion Control (DCC) solutions may be implemented to adjust the message rate, transmitting power or the modulation data rate according to a measured channel busy ratio, however, reducing message rate may increase the information updating time between platoon members, which may lead to a less safe platoon situation. Reducing transmitting power may further decrease the communication range.

Embodiments of the present application may aim to address a situation in which imperfect communication exists where, for example, messages may be lost or delayed. In such embodiments it has been recognized that a platooning control algorithm defined using a specific network or communication topology may not be optimal for every communication condition and provides a flexible method of platoon control that may adapt to the actual communication conditions.

Embodiments of the present application may control the platoon behavior of a vehicle using a control algotirhm associated with a communication topology corresponding to a set of information that is received at the vehicle. For example, the vehicle may receive a first set of information comprising radar information and a V2V message from a platoon leader and may select a control algorithm corresponding to a leader follower topology associated with the first set of information. The leader follower topology may be associated with the first set of information in that the first set of information comprises the type of information required by the leader follower topology, for example radar information and a V2V message from a platoon leader.

The vehicle may then receive a second set of information comprising radar information only. For example a V2V message from a platoon leader may have been lost due to non-ideal communication conditions. The platoon control system may select a control algorithm corresponding to a predecessor follower topology associated with the second set of information. The predecessor follower topology may be associated with the second set of information in that the second set of information comprises the type of information required by the predecessor follower topology, for example radar information only.

In embodiments a control algorithm used to control the platooning behavior of a vehicle may be selected in dependence on a set of information received at the vehicle and such a determination may be made periodically or may be made in response to a set of information being received.

Figure 2:
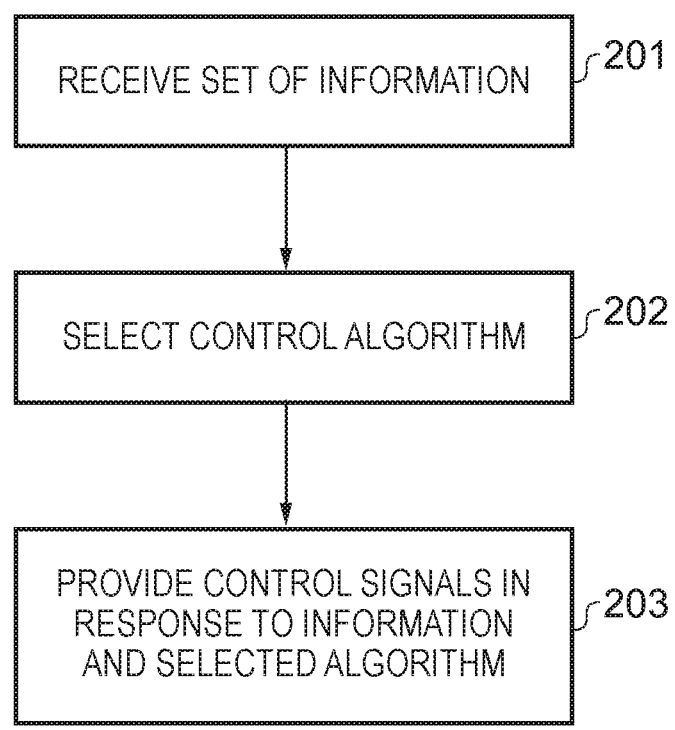
FIG. 2 is a flow diagram depicting the method steps according to an embodiment.

FIG. 2 is a flow diagram depicting method steps that may be carried out by a platoon control system. The platoon control system may form part of a vehicle travelling in a platoon and may be configured to control the vehicle in the platoon.

At step 201 the platoon control system may receive platoon information. In some examples, the platoon information may be received as one or more of radar information from a radar system of the vehicle, vehicle to vehicle messages from one or more other vehicle in the platoon and/or sensor data from the vehicle. In some examples, the information may be received and collected at an information collector. The information collector may act as an interface between a platoon controller of the platoon control system and receiving systems of the vehicle, for example a V2V receiver and/or radar receiver.

The platoon control system may operate in accordance with a plurality of platoon control topologies such as those described in relation to FIG. 1. In order to do so, the platoon control system may comprise a plurality of control algorithms where each algorithm is associated with a platoon control topology.

At step 202, the platoon control system may identify a control algorithm to be used based on the messages received. The control system may use the messages received to identify a platoon communication topology and may select a control algorithm associated with that platoon communication topology. In embodiments, a control algorithm associated with a platoon communication topology that most closely matches the types and number of messages received may be selected.

Referring to FIG. 1, it can be seen that a platoon communication topology may be associated with the types of messages that are received. For example in the predecessor follower topology of FIG. 1a, only radar information from a preceding vehicle in the platoon is received. In the leader follower topology, radar from a preceding vehicle as well as a V2V message from the platoon leader is received. While a plurality of messages may be sent to a vehicle in the platoon, it will be appreciated that not all of the messages sent to that vehicle will arrive at the vehicle.

If a platoon control system of the vehicle was operating with a control algorithm associated with a leader-follower topology but a V2V message from a leader of the platoon was lost, then the leader-follower control algorithm would operate sub-optimally. In embodiments, the platoon control system may identify the messages received and select a control algorithm corresponding to a communication topology that is associated with the received messages.

At step 203, the platoon control system may control the platoon behaviour of the vehicle in dependence on the received messages and the selected control algorithm. The controlling may for example comprise controlling the speed and acceleration of a vehicle.

Figure 3:
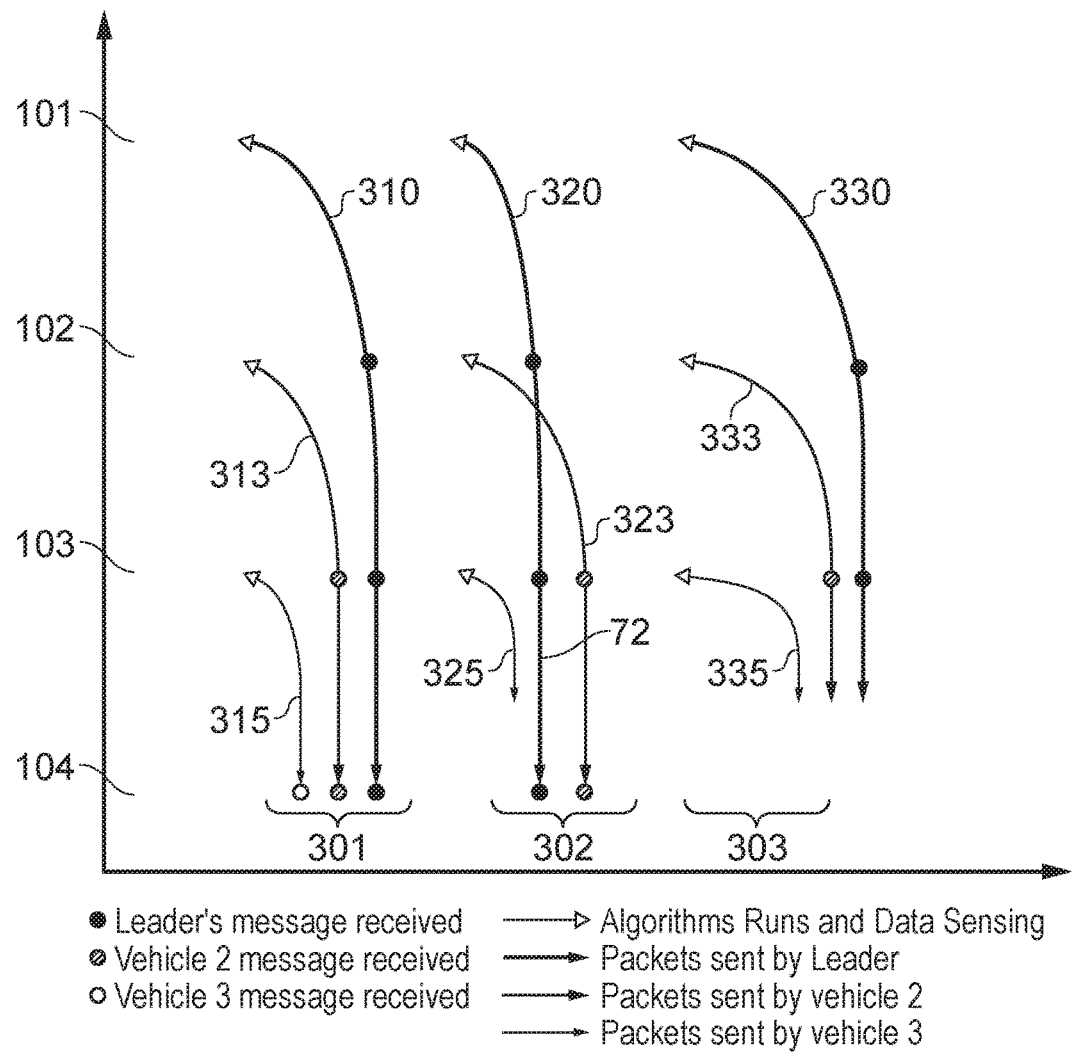
FIG. 3 shows an example of communication messages that may be sent between vehicles in a platoon.

FIG. 3 shows an example of the messages or sets of information that may be received at each vehicle in a platoon.

FIG. 3 shows three sets of messages 301, 302 and 303 being received at four vehicles 101, 102, 103 and 104 in a platoon. The first vehicle 101 may be a leader with the second 102, third 103 and fourth 104 vehicle following it consecutively.

For each set of information 301, 302 and 303, the platoon leader 101 may send a first V2V message 310; 320; 330 to the other vehicles 102, 103 and 104 in the platoon. The second vehicle 102 may send a second message 313; 323; 333 to the succeeding vehicles 103 and 104 in the platoon. The third vehicle 103 may send a third message 315; 325; 335 to the succeeding vehicle 104 in the platoon.

For the first set of message 301, the fourth vehicle 104 may receive the first message 310, second message 313 and third message 315. In this case, the platoon control system of the fourth vehicle may select a control algorithm corresponding to a communication topology in which messages from one or more of the preceding vehicles are used.

For the second set of message 302, the fourth vehicle 104 may receive the first message 320, second message 323 out of order and may not receive the third message 315 which is lost. In this case, the platoon control system of the fourth vehicle may select a control algorithm corresponding to a communication topology in which messages from a platoon leader but not the other preceding vehicles are used.

For the third set of message 303, the fourth vehicle 104 may not receive the first message 330, second message 333 or the third message 330 which are lost. In this case, the platoon control system of the fourth vehicle may select a control algorithm corresponding to a communication topology in which no messages have been received. In this case, the platoon controller system may use a special algorithm comprising predicted information of predecessor vehicles. This predicted information may be generated from stored messages and information, for example assuming that the preceding vehicles keep moving with the same acceleration as indicated in a previous message. In this case the platoon control system may request information relating to the preceding vehicles from neighboring vehicles that are known to have good communication with it.

Figure 4:
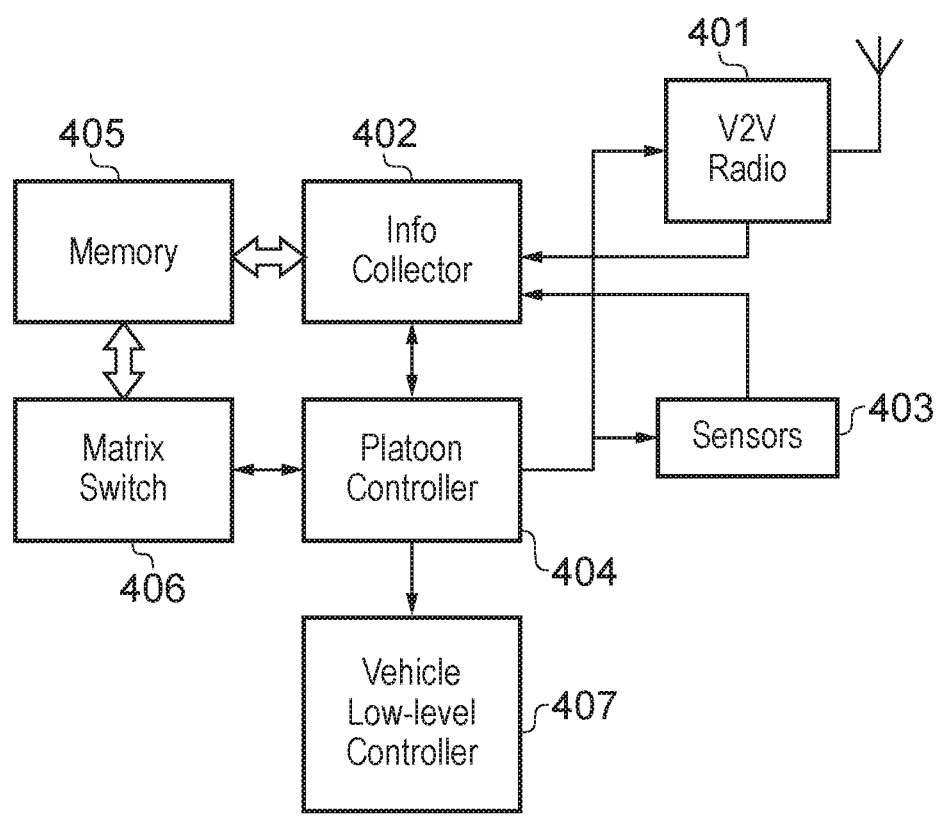
FIG. 4 shows an example of a vehicle controller in accordance with an embodiment.

FIG. 4 depicts an example apparatus that may be used to implement a platoon control system. FIG. 4 comprises a message transceiver 401, for example a V2V message transceiver. In some embodiments the message transceiver may comprise an antenna and receive processing path. In some cases, the message transceiver may share circuitry with a transmitter for V2V message. The message transceiver 401 may be coupled to provide received messages and/or information to an information collector 402 along with a sensors 403. The sensor may comprise sensors such as radar sensors and may additionally comprise a receive path to process received information from the sensors and provide this to the information collector 402. The information collector may be configured to collect the received information from the sensors 403 and/or message transceiver 401 and provide this information to a platoon controller 404. In some embodiments, the platoon controller 404 may be coupled to provide control information to the message transceiver 401 and the sensors 403.

The information collector 402 may be coupled to a memory 405. The memory may be configured to store the received information comprising, for example V2V messages and sensor data. The memory 405 may be further configured to store a plurality of control algorithms, each corresponding to a respective communication topology. An algorithm switch 406 may be coupled between the platoon controller 404 and the memory 405. The algorithm switch may be configured to store a selected control algorithm for the platoon controller. The algorithm switch may be, in some embodiments, a memory with a higher access speed than the memory 405.

The platoon controller 404 may be coupled to a low-level vehicle controller 407. The low-level controller may be configured to, in response to control information from the platoon controller 404, control the operation of the vehicle.

In operation, the platoon controller 404 may switch between control algorithms optimized for respective received information and/or messages. The control algorithms may each correspond to a communication topology, for example the control algorithms may be each optimised to operate on received information or messages that are associated with a respective communication topology. The control algorithms may be used by the platoon controller to determine control parameters for the vehicle in order to hold it in a platoon. For example, a selected control algorithm may be used to calculate acceleration and other control parameters which may be used to cyclically control the low-level vehicle controller. The low level vehicle controller may controls the mobility of the vehicle. The received messages and/or information, for example, position, speed, acceleration and/or time stamp may be stored in the memory.

A platoon control system of vehicle may receive a set of messages from surrounding vehicles or from sensor system within the vehicle. Based on this set of messages, the control system may determine a control method or algorithm which is most appropriate. In some examples, the control algorithm may be embodied by a control matrix which provides the mechanism to control the vehicle on the bases of information received in the first set of messages. Each control algorithm may be associated with a certain communication topology. Therefore if a set of messages resembling a first communication topology are received, the platoon control system can select a control algorithm corresponding to that first communication topology. In this manner, if messages are dropped or lost, the platoon control system can select a control algorithm that will provide the most accurate control based on the messages which are received.

The selection of the control algorithm may be carried in response to each set of messages received as different messages may be dropped for each set. Matching the type of messages received to a communication topology and corresponding control algorithm may allow an accurate use of the information (via the messages) that is available at a vehicle. The messages in the first set of messages may additionally be filtered so that messages of sufficient quality are used to select the control algorithm. The selected algorithm and received set of messages may be used to control the vehicle, for example, calculate an acceleration. In a case where no messages are received (for example all the messages are dropped), platoon control system may predict the behaviour of one or more other vehicles in the platoon based on a previously received set of messages stored in a memory. Sets of messages may be received periodically. If no messages are received for several cycles, the platoon control system may control the vehicle in a safety conscious manner, for example increasing a following distance to allow.

In the foregoing, it has been described that the platoon controller may control the operation of the vehicle in dependence on the received information and the selected control algorithm. In a further example, the control may be additionally in dependence on control boundary information. Control boundary information may be stored in the memory 405. Control boundary information may represent the boundaries of operation of the vehicle, for example, maximum acceleration, mass and/or size of the vehicle. In some examples, the platoon control boundary information may be received from other vehicles in the platoon or may be received from a central control or information source. In some cases a vehicle may be aware of its own control boundary information. Control boundary information may comprise, for example, maximum acceleration and de-acceleration of one or more platoon members for different road conditions (for example, different slope angles or weather conditions.) The control boundaries may be used to adjust the control metrics to improve safety.

In the foregoing control algorithms have been discussed where each control algorithm is optimised for a respective communication topology. In some examples, each pre-defined algorithm may be optimized to target a communication topology. In some embodiments, each control algorithms may be implemented through use of a corresponding control matrix. The control matrix may satisfy the known string-stability conditions with a common quadratic Lyapunov equation to reach string stability of the platoon control. Additionally, the control matrix may be a closed loop system matrix. The closed loop system matrix may operate using the boundary conditions information as boundary conditions for the closed loop system.

The invention claimed is:

1. A method, to be executed by a processor, for controlling a vehicle travelling in a platoon comprising:
   receiving a first set of information at a first vehicle in the platoon, the first set of information relating to at least one other vehicle in the platoon;
   selecting one of a plurality of control algorithms in dependence on a type of data included in the first set of information, wherein each of the plurality of control algorithms correspond to a respective platoon communication topology, wherein the type of data included in the first set of information is required by the platoon communication topology to which the selected control algorithm corresponds; and
   controlling the first vehicle in response to the first set of information and the selected one of the control algorithms.

2. The method of claim 1, wherein the first set of information comprises at least one of radar information and one or more vehicle to vehicle messages.

3. The method of claim 1 further comprising:
   storing the first set of information in a memory.

4. The method of claim 1 further comprising:
   receiving a second set of information at the first vehicle;
   selecting a further one of the plurality of control algorithms in dependence on a type of data included in the second set of information; and
   controlling the first vehicle in response to the second set of information and the selected further one of the control algorithms, wherein the type of data included in the second set of information is required by the platoon communication topology to which the selected control algorithm corresponds.

5. The method of claim 4 further comprising:
   determining that no vehicle to vehicle messages are received as part of the second set of information; and
   selecting a prediction control algorithm from the plurality of control algorithms, the prediction control algorithm configured to predict further information for the second set of information based on the stored first set of information.

6. The method of claim 5, wherein the predict further information corresponds to information carried in vehicle to vehicle messages.

7. The method of claim 4 further comprising:
   determining that no vehicle to vehicle messages are received as part of the second set of information; and
   requesting information from at least one other vehicle in the platoon.

8. The method of any preceding claim wherein the memory is further configured to store control boundary information.

9. The method of claim 8, wherein the step of controlling the first vehicle further comprises controlling the first vehicle further in response to the control boundary information.

10. An apparatus for controlling a first vehicle in a platoon, the apparatus comprising:
    at least one receiver configured to receive a first set of information relating to at least one other vehicle in the platoon; and
    a controller configured to:
    select one of a plurality of control algorithms in dependence on a type of data included in the first set of information, wherein each of the plurality of control algorithms correspond to a respective platoon communication topology, wherein the type of data included in the first set of information is required by the platoon communication topology to which the selected control algorithm corresponds; and
    provide control signals configured to control the first vehicle in response to the first set of information and selected control algorithm.

11. The apparatus of claim 10 further comprising:
    a memory configured to store the first set of information.

12. The apparatus of claim 10, wherein when the receiver receives a second set of information, the controller is further configured to:
    select a further one of the plurality of control algorithms in dependence on a type of data included in the second set of information; and
    provide control signals configured to control the first vehicle in response to the second set of information and the selected further one of the control algorithms; wherein the type of data included in the second set of information is required by the platoon communication topology to which the selected control algorithm corresponds.

13. The apparatus of claim 12, wherein the controller is further configured to determine that no vehicle to vehicle messages are received as part of the second set of information and select a prediction control algorithm from the plurality of control algorithms, the prediction control algorithm configured to predict further information for the second set of information based on the stored first set of information.

14. The apparatus of claim 10 further comprising:
a transmitter configured to transmit information associated with the first vehicle to at least on other vehicle in the platoon.

15. The apparatus of claim 10 further comprising:
a vehicle controller configured to receive the control signals and control the behavior of the first vehicle in response thereto.

* * * * *